US005921075A

United States Patent [19]

Shimoyama et al.

[11] Patent Number: 5,921,075

[45] Date of Patent: Jul. 13, 1999

[54] BURNER REPLACING SYSTEM

[75] Inventors: Hiroshi Shimoyama; Hiroshi Tsunewaki; Tadao Yashiki; Yoshichika Satoh, all of Takasago, Japan

[73] Assignee: Mitsubishi Jukogyo Kabushiki Kaisha, Tokyo, Japan

[21] Appl. No.: 08/849,996

[22] PCT Filed: Oct. 18, 1996

[86] PCT No.: PCT/JP96/03030

§ 371 Date: Aug. 5, 1997

§ 102(e) Date: Aug. 5, 1997

[87] PCT Pub. No.: WO97/14529

PCT Pub. Date: Apr. 24, 1997

[30] Foreign Application Priority Data

| | | | |
|---|---|---|---|
| Oct. 19, 1995 | [JP] | Japan | 7-270997 |
| Feb. 8, 1996 | [JP] | Japan | 8-22401 |

[51] Int. Cl.[6] .......... F02C 7/20

[52] U.S. Cl. .......... 60/39.31; 60/722; 431/155; 431/154

[58] Field of Search .......... 60/39.31, 39.37, 60/722, 740; 431/154, 155; 29/889.1, 889.2

[56] References Cited

U.S. PATENT DOCUMENTS

| | | | |
|---|---|---|---|
| 3,842,595 | 10/1974 | Smith et al. | 60/39.36 |
| 4,116,617 | 9/1978 | Backman et al. | 431/155 |
| 4,498,617 | 2/1985 | Guertin et al. | 60/740 |
| 5,233,822 | 8/1993 | Ward et al. | 60/39.02 |
| 5,430,935 | 7/1995 | Yaworsky et al. | 29/889.1 |
| 5,524,430 | 6/1996 | Mazeaud et al. | 60/752 |

FOREIGN PATENT DOCUMENTS

| | | |
|---|---|---|
| 61-182779 | 8/1986 | Japan . |
| 62-61745 | 3/1987 | Japan . |
| 63-47871 | 3/1988 | Japan . |
| 6-114666 | 4/1994 | Japan . |

*Primary Examiner*—Timothy S. Thorpe
*Assistant Examiner*—Ted Kim
*Attorney, Agent, or Firm*—Wenderoth, Lind & Ponack, L.L.P.

[57] ABSTRACT

A burner replacing system has a rail mounted in a ring around the outer periphery of burners mounted radially at the middle of a gas turbine. A carriage turns around the burners via the rail; and supports a pull-out slide via a rotary shaft which turns the slide up and down in the direction of a center axis of the gas turbine. Another rotary shaft turns the slide right and left around a radial axis of the gas turbine. The slide moves in the axial direction of the burners. A hand for gripping the burner is supported by the pull-out slide via a centering slide which moves up and down in the radial direction of the burner. An alternate system has a pull-out slide which is supported by the carriage and moves forward and backward in the axial direction of the burner. A telescopic slide is supported by the pull-out slide and expands in the axial direction of the burner. The hand is provided at the edge of the telescopic slide to grip the burner.

2 Claims, 12 Drawing Sheets

BURNER REPLACING SYSTEM

BACKGROUND OF THE INVENTION

1. Field of the Invention

The present invention relates to a burner replacing system used in removing or reassembling burners to inspect or repair the burners of a gas turbine for thermal power generation.

2. Description of Related Art

FIGS. 12*a* and 12*b* are drawings for explaining a prior art method for replacing burners in inspecting or repairing the burners of a gas turbine for thermal power generation. In the figure, 16 or so burners b are arranged radially at equal intervals at the middle part of the main body of a gas turbine g, and are inserted and assembled thereto via flanges f. Conventionally, the burner b is replaced manually by constructing simple scaffolds s, after removing pipes and other equipment around the burner b, and manipulating an overhead traveling crane c to sling the burner b by workers who get on the scaffolds.

While the burner b is replaced conventionally by the manual work as described above, the burner b is about 400 mm in outer diameter and is as long as about 1500 mm, so that workers have to enter the inside of the gas turbine g to lift up and bring out the burner b manually, in cooperation with the workers who get on the scaffolds s, in pulling out the burner b. The burner b is then slung by the overhead traveling crane c and is moved to an inspection or repair site. While it takes a long time to do that because one burner b weighs about 250 kg and needs to be divided into several parts, there is a structural limit, and some of the parts weigh around 100 kg. Therefore, because it is difficult to maintain an adequate position during the work in the narrow inner space of the gas turbine g and on the unstable outside scaffolds s, such work involves great danger. Further, because the working conditions are so bad, the burner b or the inside of the gas turbine g is damaged occasionally, taking more time and expense to repair them.

Accordingly, it is an object of the present invention to solve the aforementioned problem by providing a novel burner replacing system.

SUMMARY OF THE INVENTION

A burner replacing system of the present invention is constructed such that a rail is provided in a ring around the circumference of the gas turbine, where burners are disposed radially, such that a carriage can turn around the burners on the rail. The carriage carries a pull-out slide via a rotary shaft, which can turn the slide up and down in the direction of the center axis of the gas turbine, and via a rotary shaft which turns the slide right and left around the radial axis of the gas turbine. A hand is supported by the pulling-out slide via a centering slide which moves up and down in the direction of the diameter of the burner so as to be able to grip the burner.

The burner may be replaced by using the burner replacing system of the present invention by locating the center position of each burner in the circumferential direction with the carriage which turns around the burners. The hand is extended to the surface of a flange of the burner with the pulling-out slide to cause the center of the hand to coincide with the position of the center axis of the burner, also using the centering slide to adjust the surface of the hand to the inclination of the surface of the flange of the burner by the rotary shafts. The flange of the burner is connected with the hand, the pulling-out slide pulls out the burner from the gas turbine, and the burner is raised by the rotary shaft. The carriage is then turned to move the burner to the upper part of the gas turbine where the overhead traveling crane can reach, and the burner is slung to the overhead traveling crane to carry it out. Then an alternate burner is grasped with the hand to reassemble the gas turbine by implementing the above-mentioned procedure in the opposite way. Thereby, the burner replacing work is mechanized and the burner may be replaced at one time without requiring so much man power and without dividing it into parts. The work period may thus be shortened and the man power used in replacing the burners can be considerably saved. Further, the burner replacing system of the present invention allows safety to be improved during replacement of the burner and the burner or the gas turbine to not be damaged, because the accuracy of the work in replacing the burner is enhanced, thus eliminating the cost or work period for the repair.

Further, the burner replacing system of the present embodiment comprises a rail provided in a ring around the outer periphery of burners disposed radially around a gas turbine. A carriage moves along the rail, a pull-out slide is supported on the carriage and moves forward and backward in the direction of the axis of the burner, and a telescopic slide is supported by the pull-out slide and extends in the direction of the axis of the burner. A hand is provided at the end of the telescopic slide for gripping the burner. The burner may be pulled out of the gas turbine by using this burner replacing system by locating the circumferential center position of each burner with the carriage which turns around the burner along the rail. The pull-out slide is moved forward and the telescopic slide is expanded to abut the hand with the surface of a flange of the burner. The flange is connected with the hand by bolts, and the telescopic slide and the pull-out slide are retreated to pull out the burner from the gas turbine. The burner is moved by the carriage to the upper part of the gas turbine to sling it to the overhead traveling crane to carry it out. The burner which has been inspected and maintained, may be inserted and reassembled to the gas turbine by implementing the above-mentioned procedure in the opposite way by using the burner replacing system. Thus, the burner replacing work, such as pulling out and insertion, are mechanized, and a heavy burner may be replaced without requiring as much man power and by a compact system. The accuracy of the burner replacing work is enhanced and the burner or the gas turbine will not be damaged, allowing the work period to be reduced, man power to be saved and the safety to be remarkably improved.

The above and other advantages of the invention will become more apparent in the following description and the accompanying drawings in which like numerals refer to like parts.

DESCRIPTION OF PREFERRED EMBODIMENTS

Figure 1A:
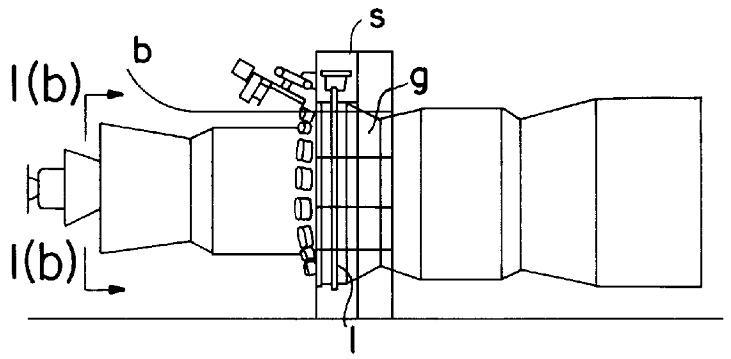
FIG. 1*a* is a front view of a burner replacing system according to one embodiment of the present invention.

FIGS. 1 through 6 are drawings for explaining a burner replacing system according to one embodiment of the present invention. In the figures, the burner replacing system of the present embodiment is used in removing or reassembling a burner in repairing or inspecting the burner of a gas turbine for thermal power generation. As shown in the figures, 16 or so burners b of the gas turbine are arranged radially at equal intervals at the middle part of a gas turbine g and are inserted and assembled via flanges f on the gas turbine g. In order to be able to facilitate the replacement of a burner b, a carriage 2 which turns around all the burners b in the direction Θ is provided in the burner replacing system. Each burner b may be replaced at one time without requiring any man power and without requiring division of the burner b into small parts by locating the center position of each burner b in the circumferential direction with the carriage 2, by extending a hand 7 to the surface of a flange f of the burner b via a pulling-out slide 5 mounted on the carriage 2 to cause the center of the hand 7 to coincide with the position of the center axis of the burner b by a centering slide 6. The surface of the hand 7 is adjusted to the inclination of the surface of the flange f of the burner b by a rotary shaft 3 for turning the pull-out slide 5 up and down and a rotary shaft 4 for turning the pull-out slide 5 right and left. The flange f of the burner b is connected with the hand 7 by three bolts or so. The pulling-out slide 5 is returned to pull out the burner b from the gas turbine g. The burner b is raised by the rotary shaft 3. The carriage 2 is turned to move the burner b to the upper part of the gas turbine g where the overhead traveling crane can reach. The burner b is slung to the overhead traveling crane to carry it out. Then, by gripping an alternate burner b with the hand 7, reassembly is performed by implementing the above-mentioned procedure in the opposite way.

Figure 1B:
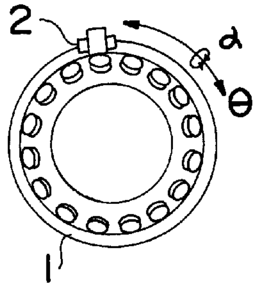
FIG. 1*b* is a side view seen from a line 1*b*—1*b* in FIG. 1*a*.
Figure 1C:
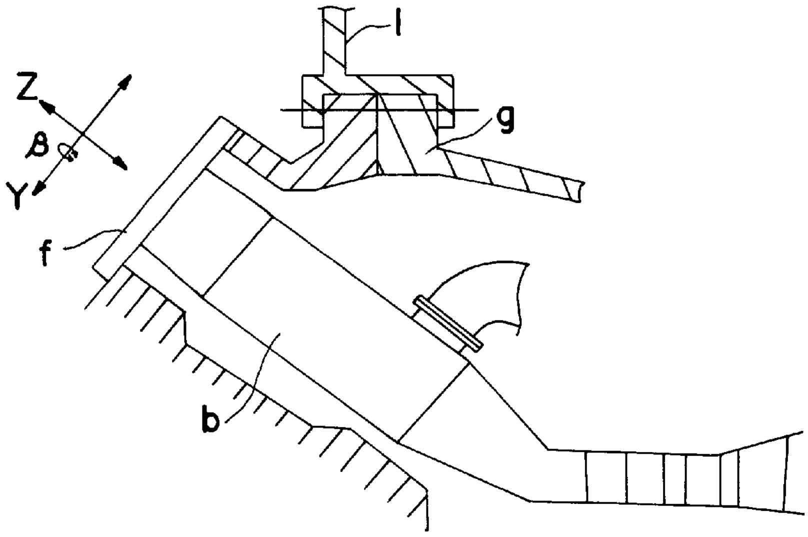
FIG. 1*c* is a detailed section view of a main part of the burner replacing system.
Figure 2A:
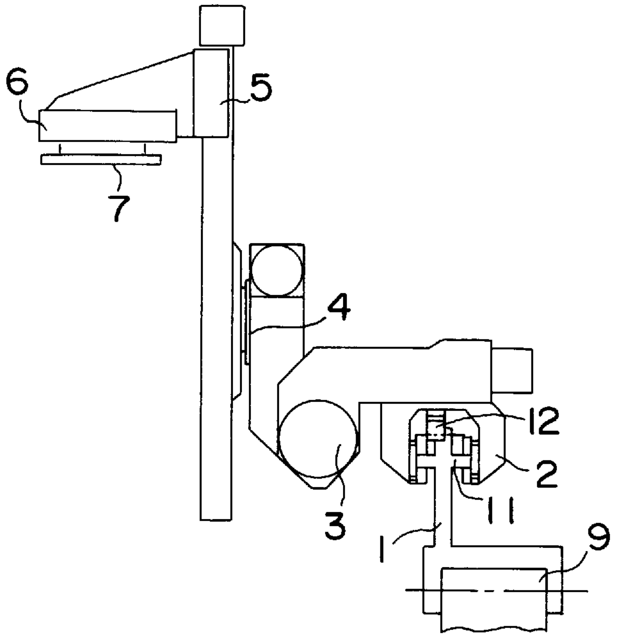
FIG. 2*a* is a front view of a Carriage of the burner replacing system.
Figure 2B:
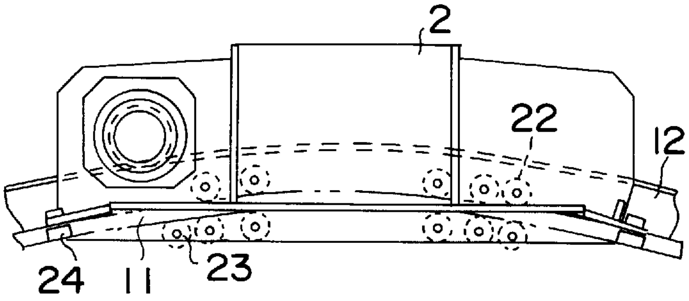
FIG. 2*b* is a side view thereof.
Figure 2C:
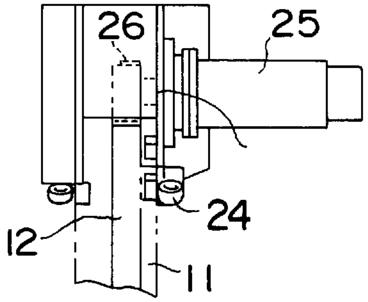
FIG. 2*c* is a detailed view of the main part thereof.

That is, as shown in FIGS. 1(*a*) and 1(*c*), a T-shaped rail 1 is laid in a ring around the outer periphery of the gas turbine g at the middle part thereof, where the burners b are mounted, and the carriage 2 runs and turns on the rail 1 in the direction e. The rotary shaft 3, which turns the pull-out slide 5 up and down in the direction a toward the center axis of the gas turbine g, is mounted in the middle of the carriage 2 as shown in FIGS. 2(*a*)–(*c*), and the rotary shaft 4, which turns the pull-out slide 5 right and left in the direction of β, i.e. around the radial axis of the gas turbine g, is mounted at a turnable portion connected with rotary shaft 3. A driving portion of the rotary shaft 4 supports the pulling-out slide 5, which moves in the direction of Z of the axis of the burner b. The centering slide 6 moves in the direction Y of the diameter of the burner b and is provided on the movable portion of the pulling-out slide 5. The hand 7, which is connected with the flange f of the burner b by bolts, is mounted at a movable portion of the centering slide 6. The carriage 2 is clamped and guided by upper wheels 22, lower wheels 23 and width wheels 24 mounted to a frame of the carriage 2, in correspondence with a rail flange 11 which forms the T-shape of the rail 1. The carriage 2 is allowed to run by engaging a pinion 26 at an output shaft of a motor 25 with a rack 12 attached to the rail 1.

Figure 3A:
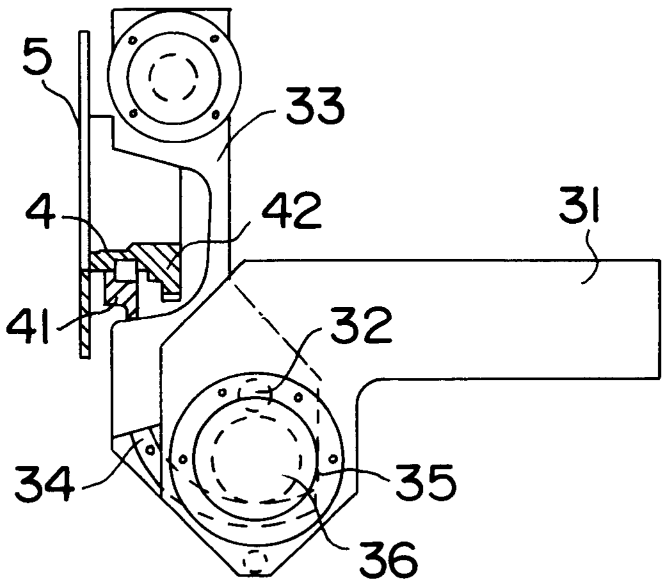
FIG. 3*a* is a front view of a rotary frame.
Figure 3B:
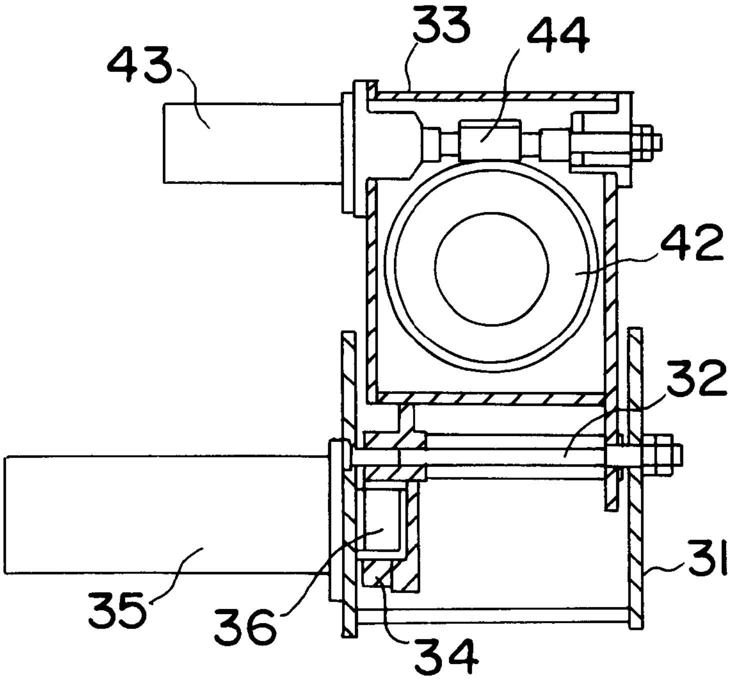
FIG. 3*b* is a section view thereof.

The rotary shaft 3 comprises a shaft 32 provided in a fixed frame 31 mounted on the carriage 2 and a turnable frame 33 mounted via the shaft 32 as shown in FIGS. 3*a* and 3*b*. A pinion 36 at an output shaft of a motor 35 mounted to the fixed frame 31 is engaged with a circular gear 34 which is centered on the shaft 32 mounted at the basal end of the turnable frame 33 to drive the turnable frame 33. The rotary shaft 4 is supported by a bearing 41 at the center of the turnable frame 33. A worm 44 at an output shaft of a motor 43 mounted to the turnable frame 33 is engaged with a worm wheel 42 attached at one side of the rotary shaft 4 to drive the rotary shaft 4.

Figure 4A:
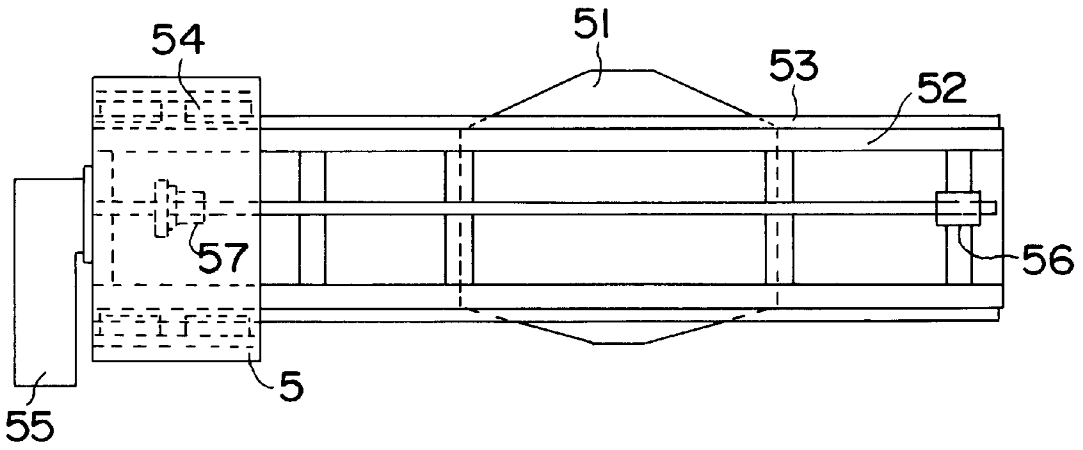
FIG. 4*a* is a front view of a pull-out slide.
Figure 4B:
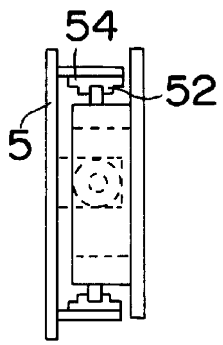
FIG. 4*b* is a side view thereof.

The pulling-out slide 5 is fitted via a guide 54 to rails 53 attached at both sides of a frame 52 based on a flange 51 mounted to the rotary shaft 4. A screw of an output shaft of a motor 55 fixed to the frame 52 is supported by a bearing 56. A nut 57 is mounted at the lower part of the pulling-out slide 5 and engaged with the screw as shown in FIGS. 4*a* and 4*b* to drive the pulling-out slide 5.

Figure 5A:
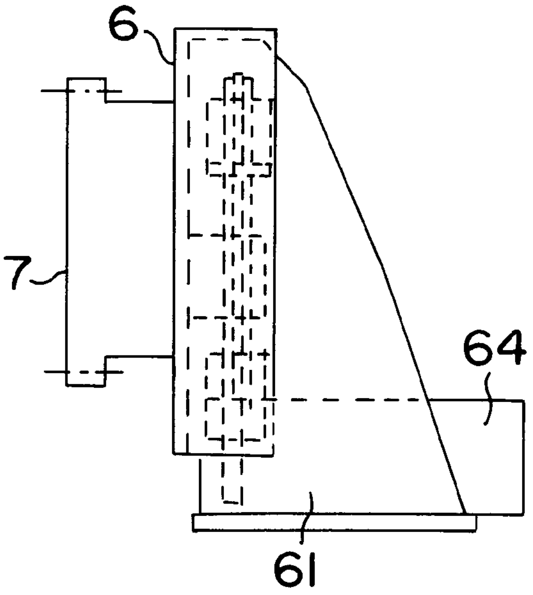
FIG. 5*a* is a side view of a centering slide.
Figure 5B:
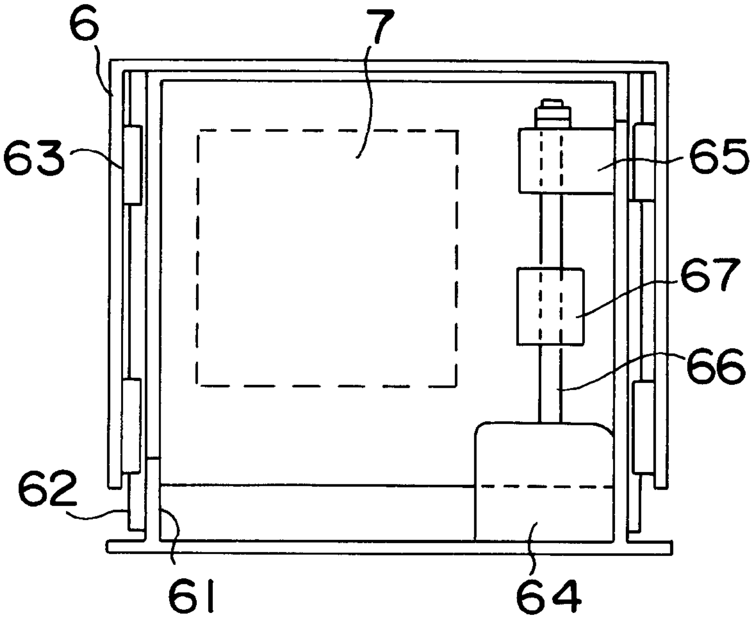
FIG. 5*b* is a front view thereof.
Figure 6A:
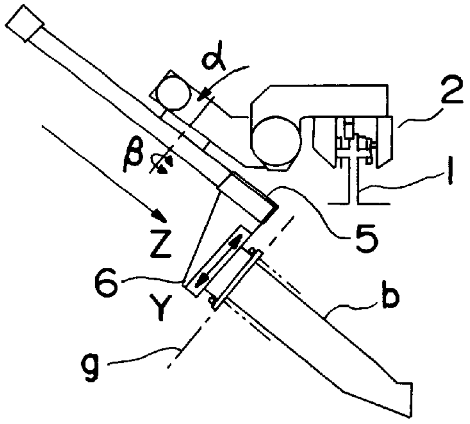
FIGS. 6*a* through 6*c* are drawings for explaining the operation of the burner replacing system.
Figure 6B:
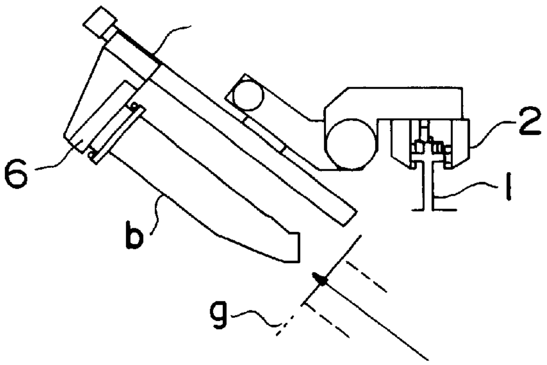
Figure 6C:
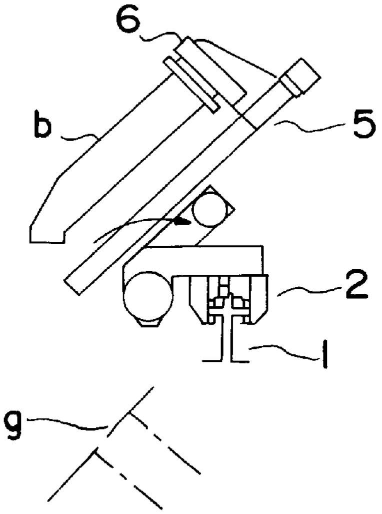

The centering slide 6 is mounted by fitting a guide 63 with a rail 62 mounted at the both sides of a fixed frame 61 mounted to the pulling-out slide 5. A nut 67 is engaged with a screw 66 supporting an output shaft of a motor 64 at the lower part of the fixed frame 61 to drive the centering slide 6 as shown in FIGS. 5*a* and 5*b*. Thus, the hand 7, an end effector, is mounted at the movable part of the centering slide 6. Bolt holes are perforated through the hand 7 corresponding to screw holes provided on the surface of the flange f of the burner b. The hand 7 has a flange shape.

The burner b is replaced by the present system by locating the hand 7 of the replacing unit M at the flange surface of the burner b with the carriage 2. The position is adjusted to the mount angle of the burner b by the rotary shaft 3 and the pulling-out slide 5 is moved forward. The hand 7 is positioned at the center of the flange surface of the burner b with the rotary shaft 4 and the centering slide 6. The hand 7 is then connected with the flange by bolts. Then, the pulling-out slide 5 is retreated to take out the burner b, and the removed burner b is raised by the rotary shaft 3 so as to be able to sling it with the overhead traveling crane.

While the burner b is conventionally replaced by manual labor, the burner b is about 400 mm in outer diameter and is as long as about 1500 mm, so that workers also have to enter the inside of the gas turbine g to lift up and bring out the burner b manually, in cooperation with workers who get on the scaffolds s in pulling out the burner b. The burner b is then slung by the overhead traveling crane c and moved to an inspection or repair site. Further, while it takes a long time to do that, because one burner b weighs about 250 kg and needs to be divided into several parts, there is a structural limit, and some of the parts weigh around 100 kg. Therefore, because it is difficult to keep an adequate position during the works in the narrow inner space and on the unstable outside scaffolds, such work involves great danger. Further, because the working conditions are so bad, the burner b or the inside of the gas turbine g are occasionally damaged, leading to more time and expense being taken to repair them.

However, the present burner replacing system is constructed such that the rail 1 is provided in a ring around the circumference of the gas turbine g and that the carriage 2 turns around the burner b on the rail 1 by an angle of Θ. The carriage 2 carries the rotary shaft 3, which turns the pull-out slide 5 up and down in the direction of the center axis of the gas turbine g. The rotary shaft 4 turns the pull-out slide 5 right and left around the radial axis of the gas turbine g. The pulling-out slide 5 is supported by the rotary shaft 4 and moves in the axial direction of the burners b disposed radially, and the centering slide 6 is supported by the pulling-out slide 5 and moves up and down in the direction of the diameter of the burner b so as to be able to pull out or to reassemble the burner b with the hand 7 attached at the end of the centering slide 6. Accordingly, the burner b may be pulled out or inserted at one time without dividing it into parts while replacing the burner b, thus shortening the work period and saving considerable man power. Further, because the manual work in replacing the burner b is mechanized, the safety in replacing the burner b is improved. Still more, because the accuracy of work in replacing the burner b is enhanced and the burner b or the gas turbine g will not be damaged, no cost or work period for repair becomes necessary.

FIGS. 7 through 11 are drawings for explaining a burner replacing system according to another embodiment of the present invention. In the figures, the burner replacing system of the present embodiment is used in inspecting or repairing of burners of a gas turbine for thermal power generation. 16 burners or so, each comprising a nozzle n and a tail cylinder t, are arranged radially at equal intervals at the middle part of the gas turbine g and are connected thereto via a flange. In order to be able to readily replace the burner b, the present burner replacing system comprises, as shown in the figure, a rail 101 laid in a ring around the gas turbine g and a carriage 102 which turns around the burner b via the rail 101. A pull-out slide 103, which moves in the direction of the axis of the burner b and is radially disposed, and a multi-staged telescopic slide 104 which is supported by the pull-out slide 103 and expands in the direction of the axis of the burner b, are mounted to the carriage 102. A hand 105 for gripping the burner b is provided at the end of the telescopic slide 104 to reduce the size of the whole system and to be able to pull out or insert the burner b from or to the gas turbine g without various pipes p around the burner b.

Figure 7A:
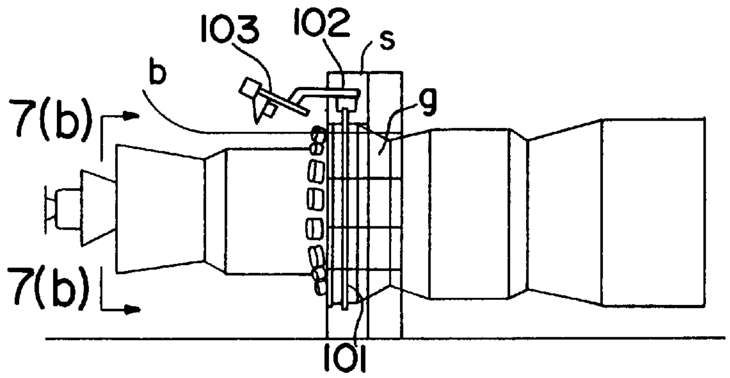
FIG. 7*a* is a front view of a burner replacing system according to another embodiment of the present invention.
Figure 7B:
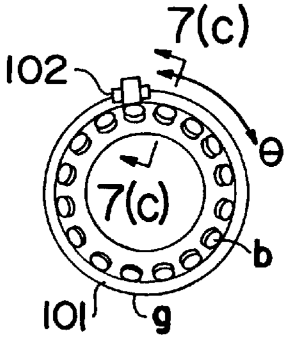
FIG. 7*b* is a view seen from a line 7*b*—7*b* in FIG. 7*a*.
Figure 7C:
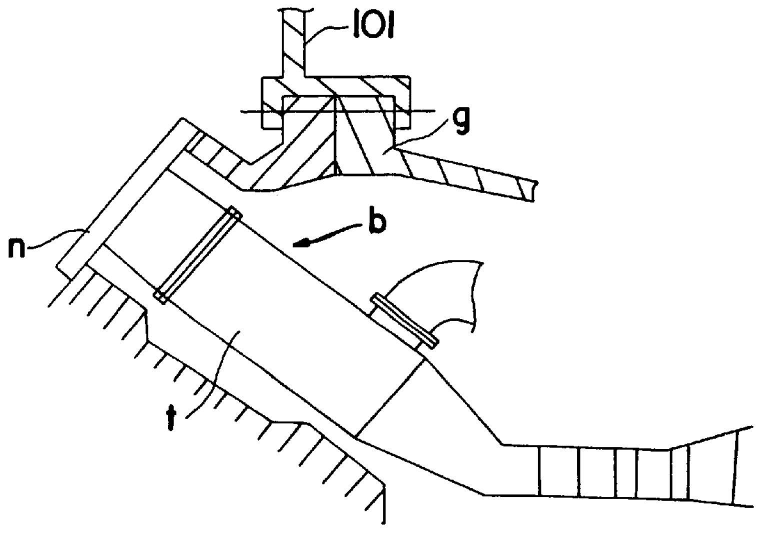
FIG. 7*c* is a section of a rail thereof.

That is, as shown in FIGS. 7(*a*)–(*c*), the rail 101 having a T-shaped section is laid in a ring around the middle part of the gas turbine g where the burners b are mounted and the carriage 102 runs and turns in the direction Θ on the rail 101. The pull-out slide 103, which moves in the direction of the axis of the burner b, is mounted on the carriage 102. The telescopic slide 104, which actuates in the direction of the axis of the burner b, is provided at the moving part of the pull-out slide 103. The hand 105, which can be connected with the nozzle n and the flange of the tail cylinder t with bolts, is attached at the end of the moving part of the telescopic slide 104.

Figure 8A:
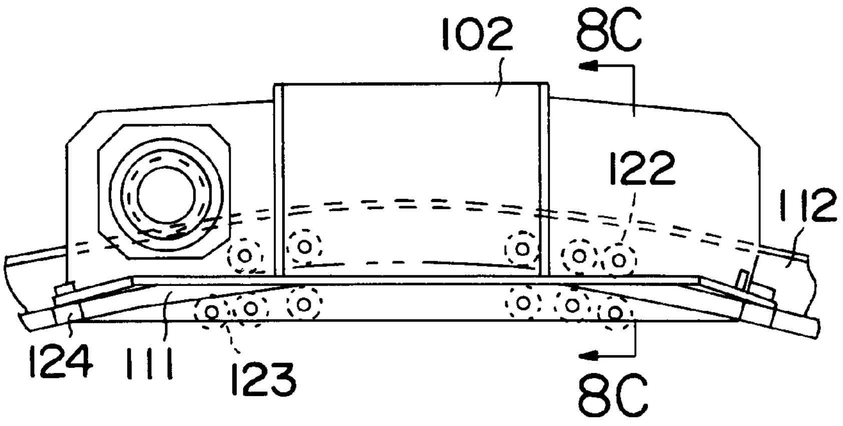
FIG. 8*a* is a front view of a carriage of the burner replacing system.
Figure 8B:
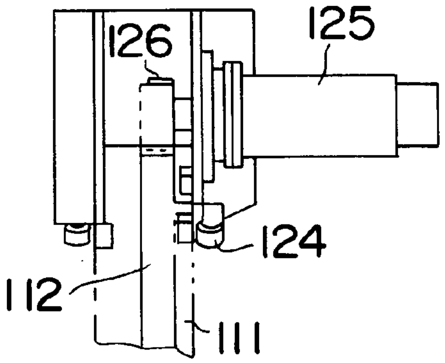
FIG. 8*b* is a side view thereof.
Figure 8C:
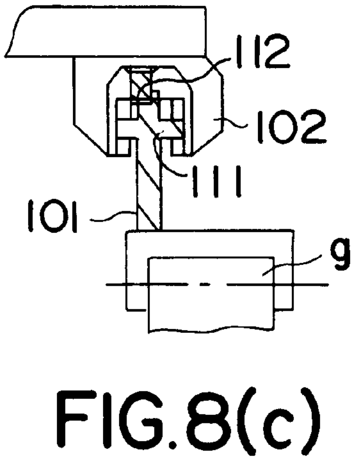
FIG. 8*c* is a section view along a line 8*c*—8*c* in FIG. 8*a;*
Figure 9A:
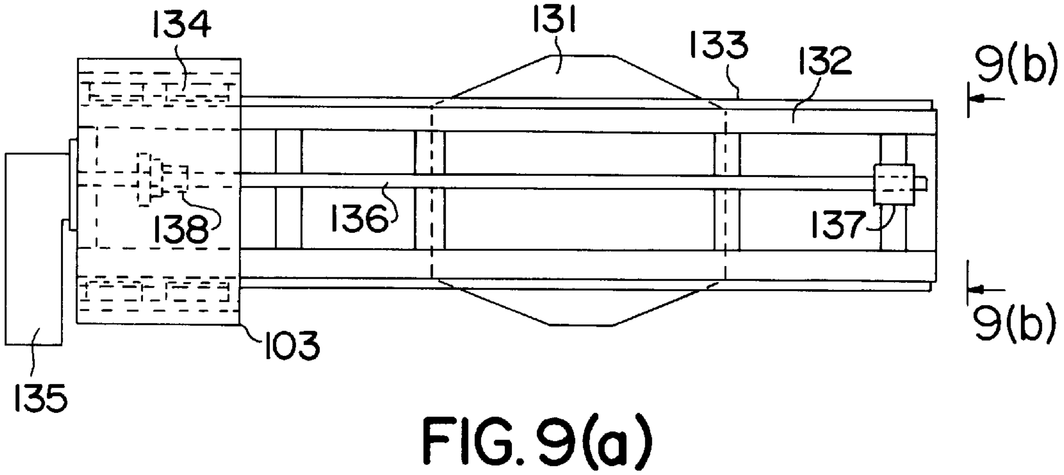
FIG. 9*a* is a plan view of a pull-out slide thereof.
Figure 9B:
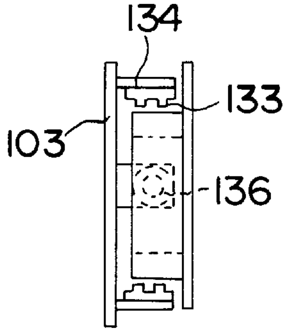
FIG. 9*b* is a view seen from 9*b*—9*b* in FIG. 9*a;*
Figure 10A:
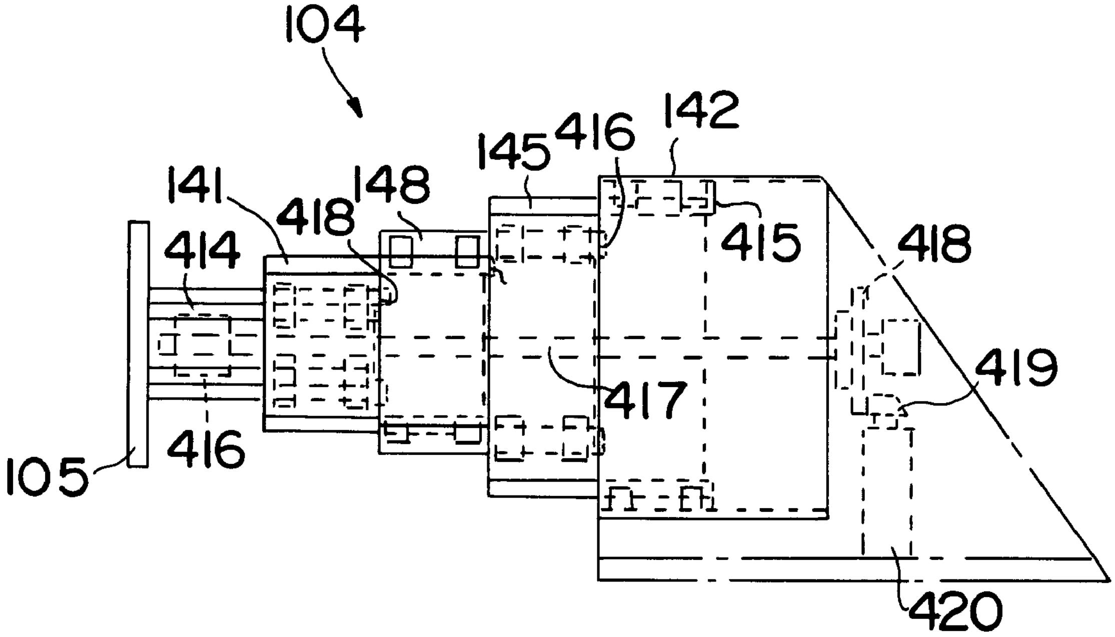
FIG. 10*a* is a front view of a telescopic slide thereof.
Figure 10B:
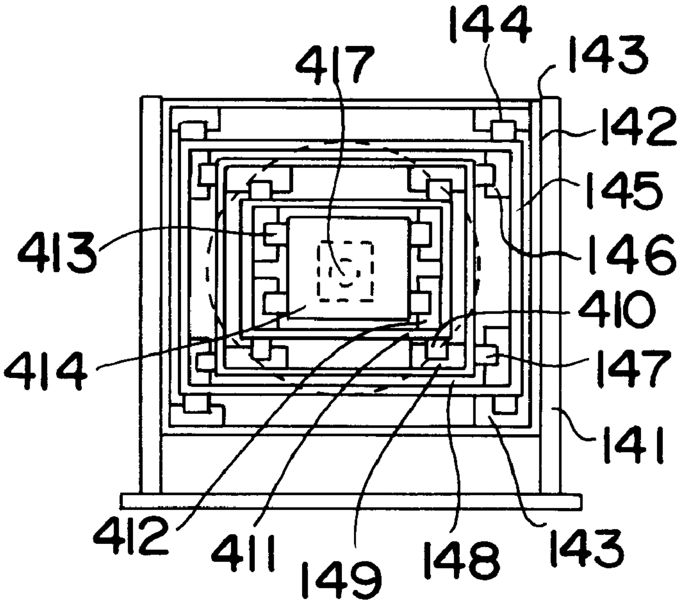
FIG. 10*b* is a side view thereof.

The carriage 102 is clamped and guided by upper wheels 122, lower wheels 123 and width wheels 124 mounted to a frame in correspondence with a rail flange 111 of the rail 101. The carriage 102 is run by engaging a pinion 126 attached to an output shaft of a motor 125 with a rack 112 attached to the rail 101 as shown in FIGS. 8(*b*)–(*c*). Further, the pull-out slide 103 is fitted, via a guide 134, on a rail 133 attached on both sides of a frame 132, which in turn is constructed and based on a flange 131 mounted on the carriage 102, as shown in FIGS. 9(*a*)–(*b*). A screw 136, which is driven by the output of a motor 135 fixed to the frame 132, is supported by a bearing 137. A nut 138 is mounted at the lower part of the pull-out slide 103 and engaged with the screw 136 to drive the pull-out slide 103.

The telescopic slide 104 comprises four sets of frames in total. A box type outer frame 142 is mounted to a fixed frame 141 mounted to the pull-out slide 103. Grooved rail guides 143 are provided at four corners of the outer frame 142 and receive rails 144 which fit therein. The rails 144 are mounted at four corners of the outer surfaces of an inner frame 145. An inner frame 148 has rails 147 which fit in guides 146 provided at four corners of the inside of the inner frame 145. The rails 147 are provided at four corners of the outer surface of the inner frame 148. An inner frame 411 has rails 410 which fit in guides 149 provided at four corners of the inside of the inner frame 148. The rails 410 are provided at four corners of the outer surface of the inner frame 411. An inner frame 414 has rails 413 which fit in guides 412 provided at four corners of the inside of the inner frame 411. The rails 413 are provided at four corners of the outer surface of the inner frame 414. The rigidity is enhanced by alternately differentiating the surface of each frame where the rail is mounted, also reducing the overall section size. Further, stoppers 415, 416, 417 and 418, which abut the guides, are mounted on the rails of each inner frame so that they will not be pulled out. Further, the basal portion of a screw shaft 417, which runs through a nut 416 fixed at the center of the end inner frame 414, is mounted turnably on the fixed frame 141. A gear 419 orthogonally engages with a crown gear 418 mounted on the screw shaft 417, and is connected with an output shaft of a motor 420 mounted to the fixed frame 141. The hand 105 attached at the end of the inner frame 414 has a flange shape through which bolt holes are perforated in correspondence with the nozzle n and the flange surface of the tail cylinder t of the burner b.

Figure 11A:
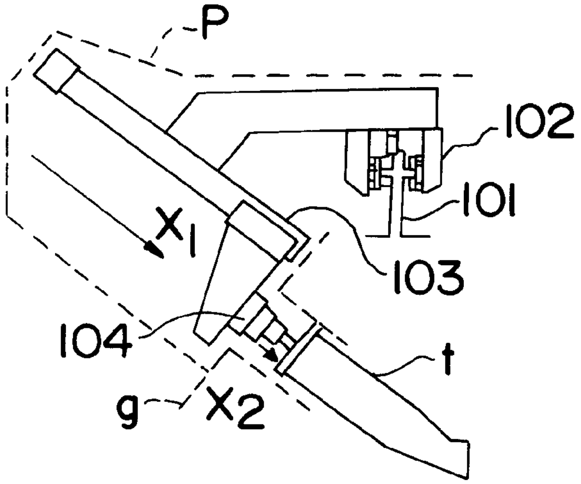
FIGS. 11*a* through 11*c* are drawings for explaining the operation of the second embodiment of the burner replacing system.
Figure 11B:
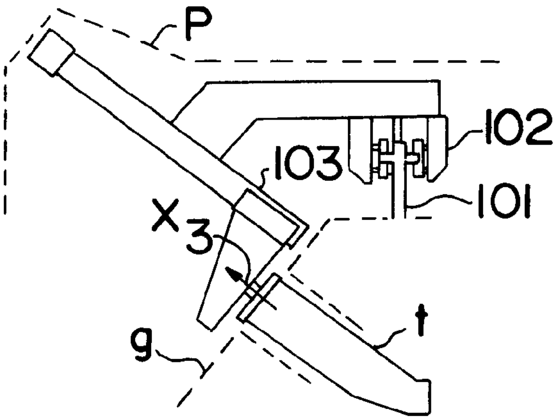
Figure 11C:
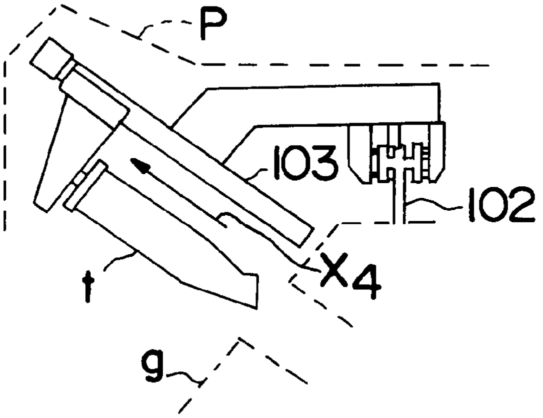
Figure 12A:
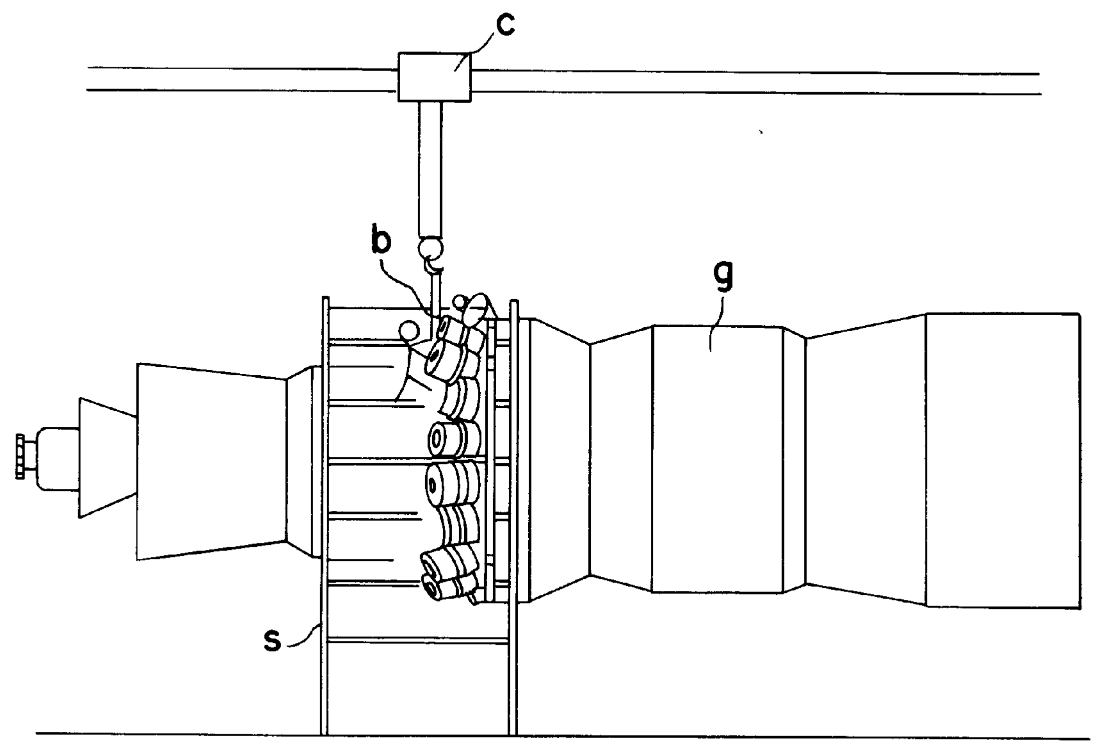
FIG.12(a) PRIOR ART
FIG. 12*a* is a drawing for explaining a prior art method for replacing burners and FIG. 12*b* is a front view of a burner.
Figure 12B:
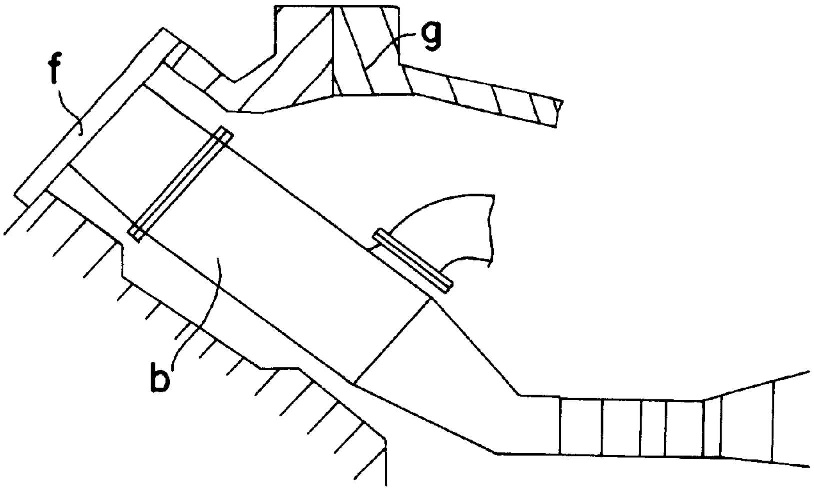
FIG.12(b) PRIOR ART

The tail cylinder t may be pulled out, for example to replace the burner b, by using the burner replacing system of the present embodiment. The carriage 102 causes the hand 105 to face the flange surface of the tail cylinder t of the burner b. The pullout slide 103 is moved forward to the maximum by X1, and the telescopic slide 104 is expanded by X2 by pushing out the inner frame 411 at the end by turning the screw shaft 417 with the motor 420 via the gear 419 and the crown gear 418. The next inner frame 414 is pushed out if the stopper 418 abuts the guide 412, the next inner frame 148 is pushed out if the stopper 417 abuts the guide 149, and the next inner frame 145 is pushed out if the stopper 416 abuts the guide 146. The hand 105 is positioned at the center of the flange surface of the tail cylinder t to connect with bolts as shown in FIG. 11*a*. Then the telescopic slide 104 is retreated by X3 by reverse operation as shown in FIG. 11*b* and the pull-out slide 103 is retreated by X4 as shown in FIG. 11*c* to pull out the tail cylinder t completely from the gas turbine g. Further, the carriage 102 is turned to a horizontal part at the upper part of the gas turbine g to be able to readily sling the tail cylinder t to the overhead traveling crane to enable it to be carried out. It is noted that the nozzle n may be pulled carry out only by the pullout slide 103, while stopping the telescopic slide 104. Further, the nozzle n and the tail cylinder t may be inserted by implementing the above-mentioned procedure in the opposite way.

When the burner b is replaced conventionally by manual labor, the burner b is about 400 mm in outer diameter and is as long as about 1500 mm. Workers have to enter the inside of the gas turbine g to lift up and to bring out the burner b manually in cooperation with workers who get on the scaffolds s in order to pull out the burner b. The burner b is then slung to the overhead traveling crane c and moved to an inspection or repair site. While it takes a long time to do that, because the nozzle of the burner weighs about 350 kg and the tail cylinder weighs about 90 kg, and needs to be divided into several parts, there is a structural limit. Further, because it is difficult to keep an adequate position during the work in the narrow inner space and on the unstable outside scaffolds, such work involves great danger. Further, because the working conditions are so bad, the burner b or the inside of the gas turbine g are occasionally damaged, requiring more time and expense to be taken to repair them. It has been difficult to mechanize the burner replacing operation, because the system could not but be large and to implement it spacewise because the space is congested with various pipes such as fuel and cooling pipes.

The burner replacing system of the present embodiment comprises the rail 101 laid in a ring around the burner b, assembled radially at the middle part of the gas turbine, and the carriage 102 mounted to the rail flange 111. The pull-out slide 103, which moves in the direction of the axis of the radially disposed burners b, is mounted on the carriage 102. Telescopic multi-stages are formed by inserting inner frames, on whose outer surface are mounted rails, into outer frames, with guides at their inner corners, one by one. A nut is attached at the center of the end of the inner frame to provide the telescopic slide 104 through which the screw shaft 417, driven by the motor 420 provided on the frame, runs through. The hand 105 for gripping the burner b is provided at the end of the telescopic slide 104.

The burner b may be pulled out of the gas turbine g by using the burner replacing system of the present embodiment by locating the circumferential center position of each burner b with the carriage 102, which turns around the burner b. The pull-out slide 103 is moved forward to abut the hand 105 with the flange surface of the nozzle n of the burner b. The flange is connected with and the hand 105 with about three bolts. The nozzle n is separated from the tail cylinder t within the gas turbine g. The pull-out slide 103 is retreated to pull out the nozzle n from the gas turbine g. The carriage 102 is moved to the upper part of the gas turbine g to be able to readily sling the nozzle n to the overhead traveling crane to carry it out. Thereafter, the pull-out slide 103 is moved forward in the same manner and the telescopic slide 104 is expanded to abut the hand 105 with the flange of the tail cylinder t deep inside the gas turbine g. They are connected by bolts, and the slides are retreated to pull out and to carry out the tail cylinder t. The tail cylinder t or the nozzle n which has been inspected and maintained may be reassembled by implementing the above-mentioned procedure in the opposite way.

Thus, a heavy burner may be pulled out or inserted without requiring as much man power. Further, because the multi-staged telescoping slide 104 has a structure in which the square rails are disposed at four corners of the box type frames, it allows the section size to be reduced, to sustain as high a load as 90 kg with a light weight structure and to maintain accuracy. Further, the replacing work such as pulling out and inserting the burner b may be mechanized by the compact system and may be implemented in a small space where various pipes exist. Further, the mechanization of the replacing work of the burner b allows the work period to be reduced, man power to be saved and the safety to be remarkably improved. Because the accuracy of the operation during the burner replacing works is enhanced, the gas turbine g will not be damaged and the reliability of the replacing work may be maintained.

While preferred embodiments have been described, variations thereto will occur to those skilled in the art within the scope of the present inventive concepts which are delineated by the following claims.

We claim:

1. A burner replacing system, comprising:

a rail mounted in a ring around an outer periphery of burners mounted radially at the middle of a gas turbine;

a carriage which turns around said burners via said rail;

a pull-out slide which is supported on said carriage via a rotary shaft which turns said slide up and down in the direction of a center axis of said gas turbine and a rotary shaft which turns said slide right and left around a radial axis of said gas turbine, said pull-out slide moving in the direction of a center axis of said radially disposed burners; and a hand, supported by said pull-out slide via a centering slide which moves up and down in a radial direction of said burner, for gripping said burner.

2. A burner replacing system, comprising:

a rail mounted in a ring around the outer periphery of a plurality of burners radially disposed;

a carriage which moves along said rail;

a pull-out slide which is supported by said carriage and moves forward and back in the direction of a center axis of said burner;

a telescopic slide which is supported by said pull-out slide and expands in the direction of said axis of said burner; and a hand, provided at an edge of said telescopic slide, for gripping said burner.

* * * * *